Feb. 11, 1958  R. C. CLOUGH ET AL  2,823,296
APPARATUS FOR WELDING CONTACTS ONTO A PART
Filed May 16, 1955  11 Sheets-Sheet 1
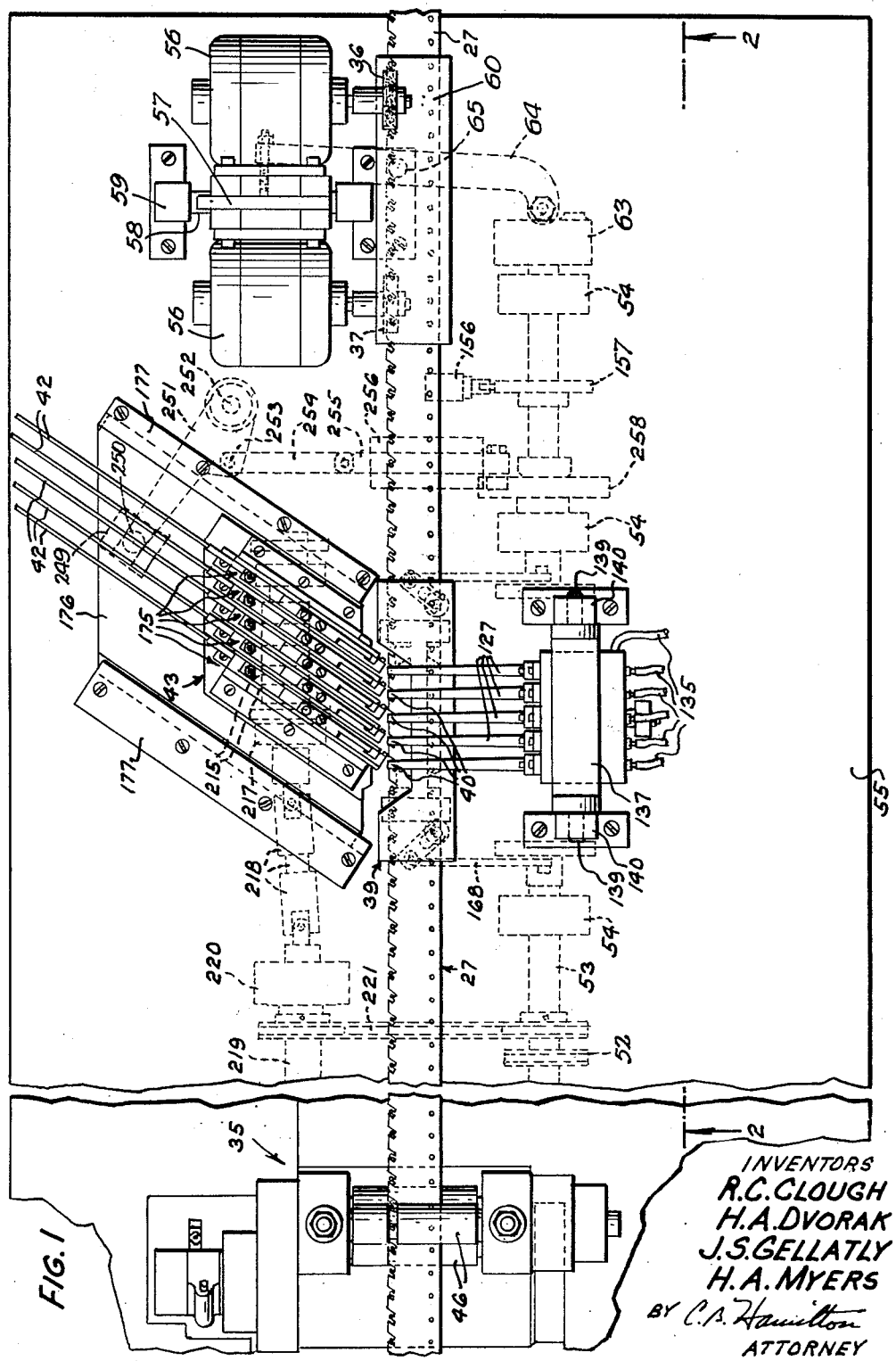
FIG. I
INVENTORS
R.C. CLOUGH
H.A. DVORAK
J.S. GELLATLY
H.A. MYERS
BY C.A. Hamilton
ATTORNEY

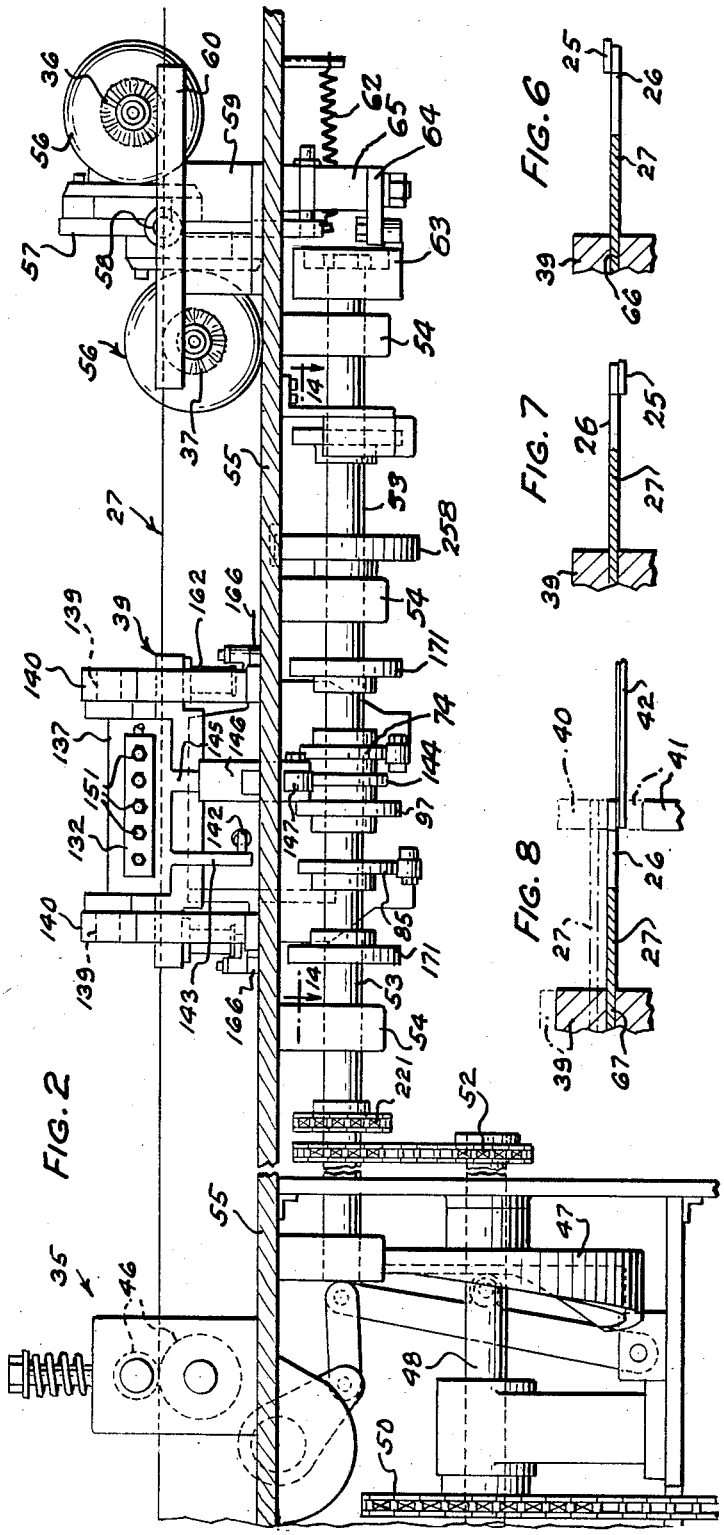

INVENTORS
R.C. CLOUGH
H.A. DVORAK
J.S. GELLATLY
H.A. MYERS
BY C.B. Hamilton
ATTORNEY

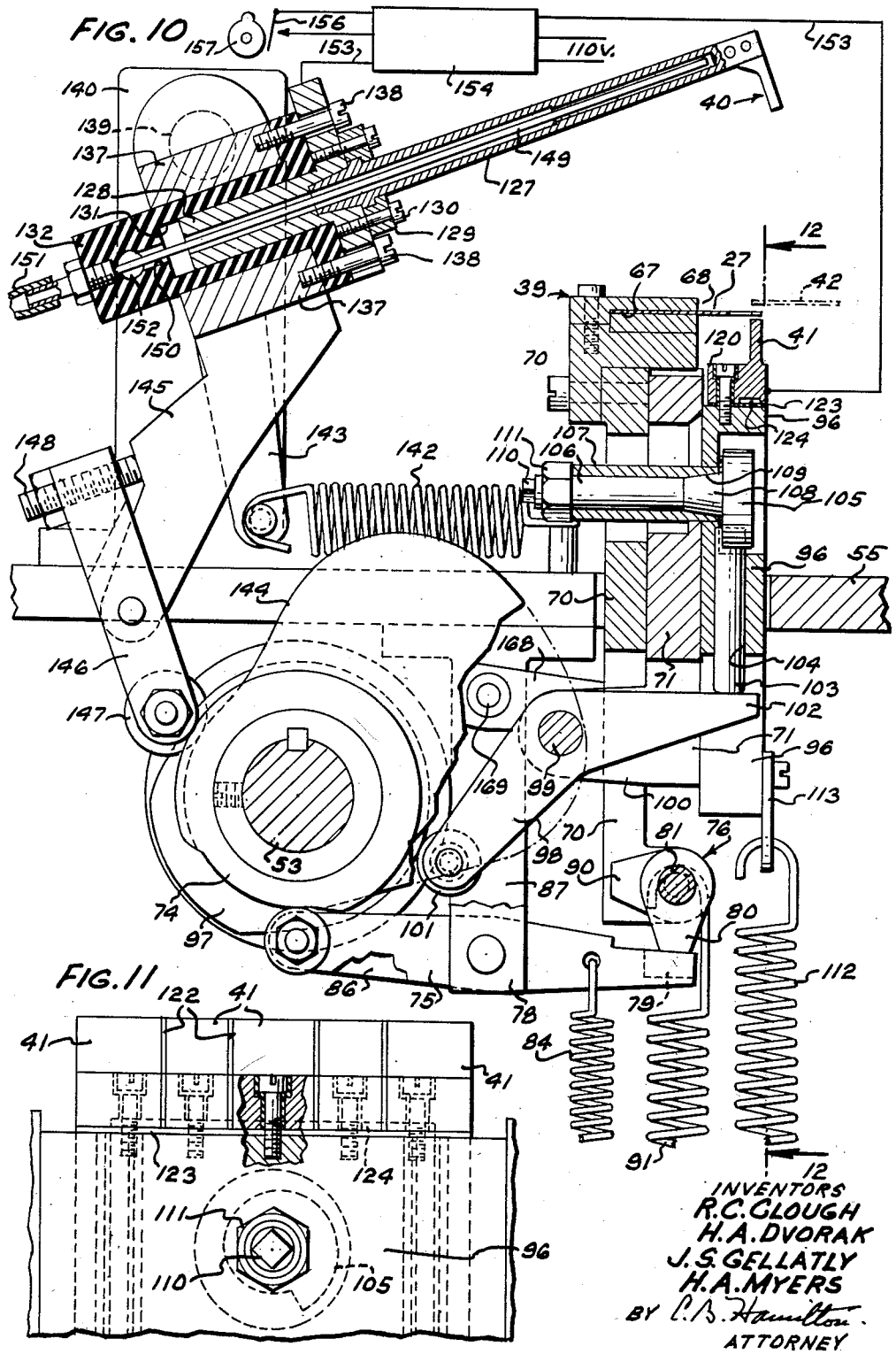

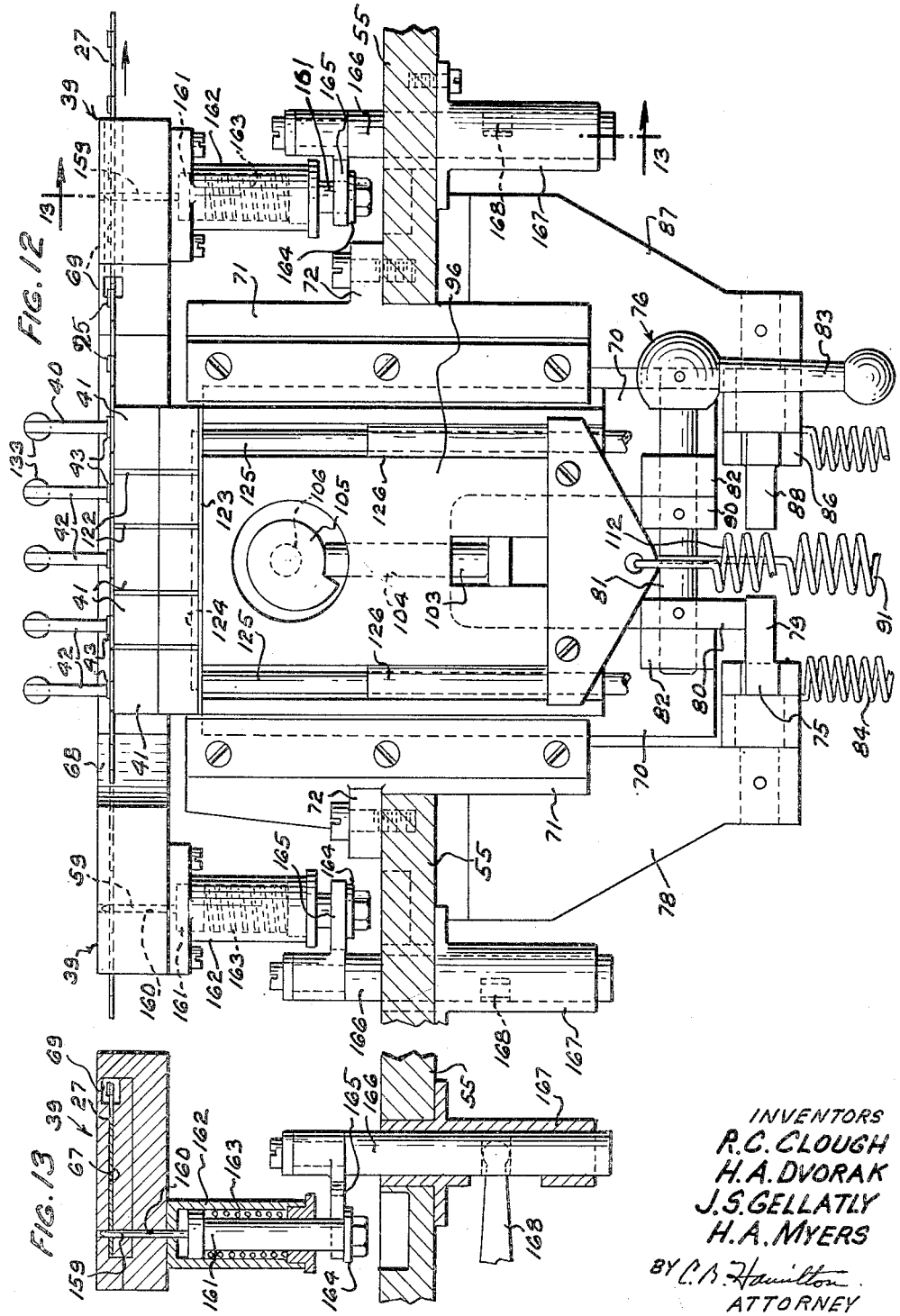

INVENTORS
R. C. CLOUGH
H. A. DVORAK
J. S. GELLATLY
H. A. MYERS
BY C. B. Hamilton
ATTORNEY

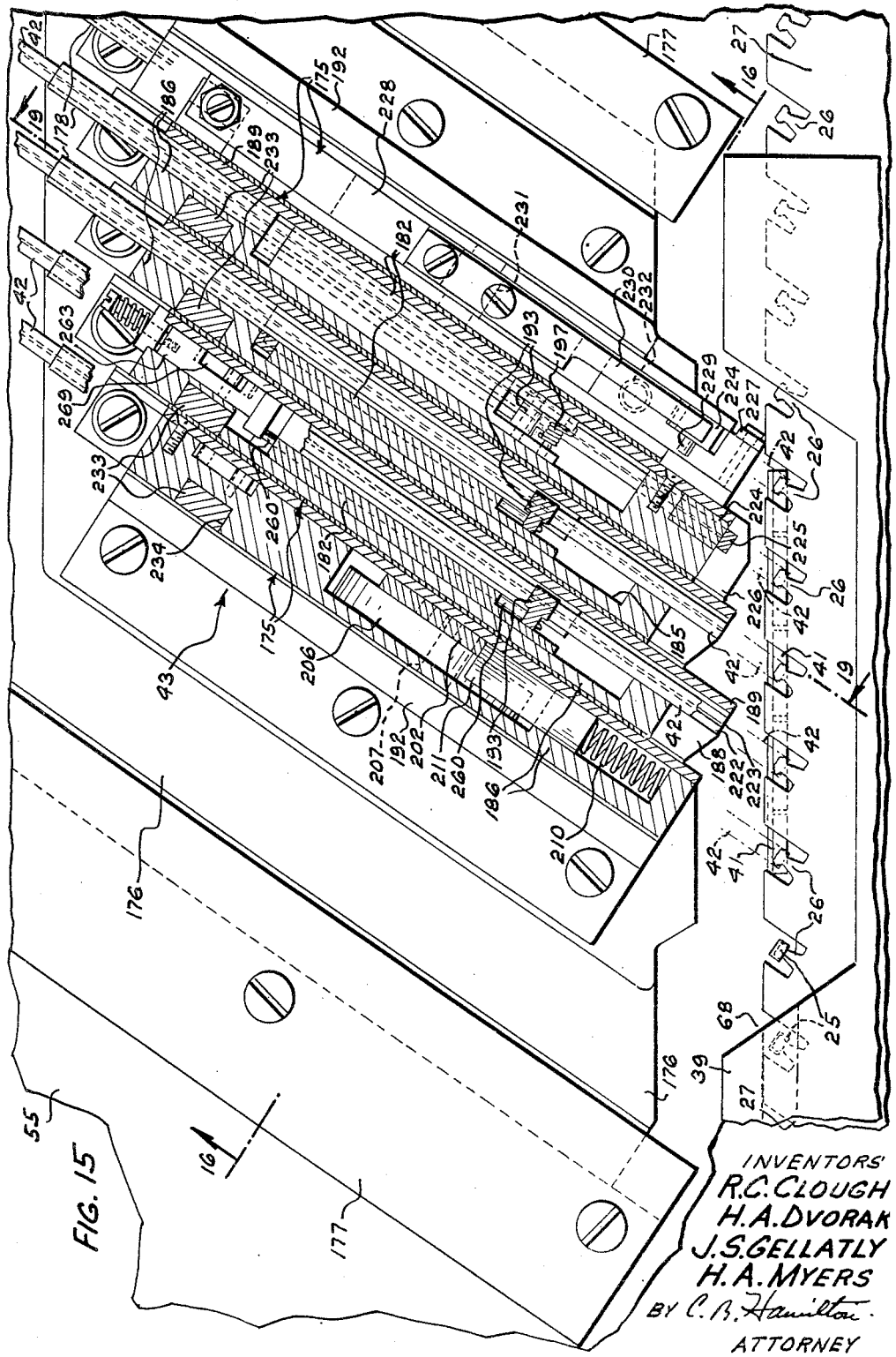

Feb. 11, 1958    R. C. CLOUGH ET AL    2,823,296
APPARATUS FOR WELDING CONTACTS ONTO A PART
Filed May 16, 1955    11 Sheets-Sheet 8
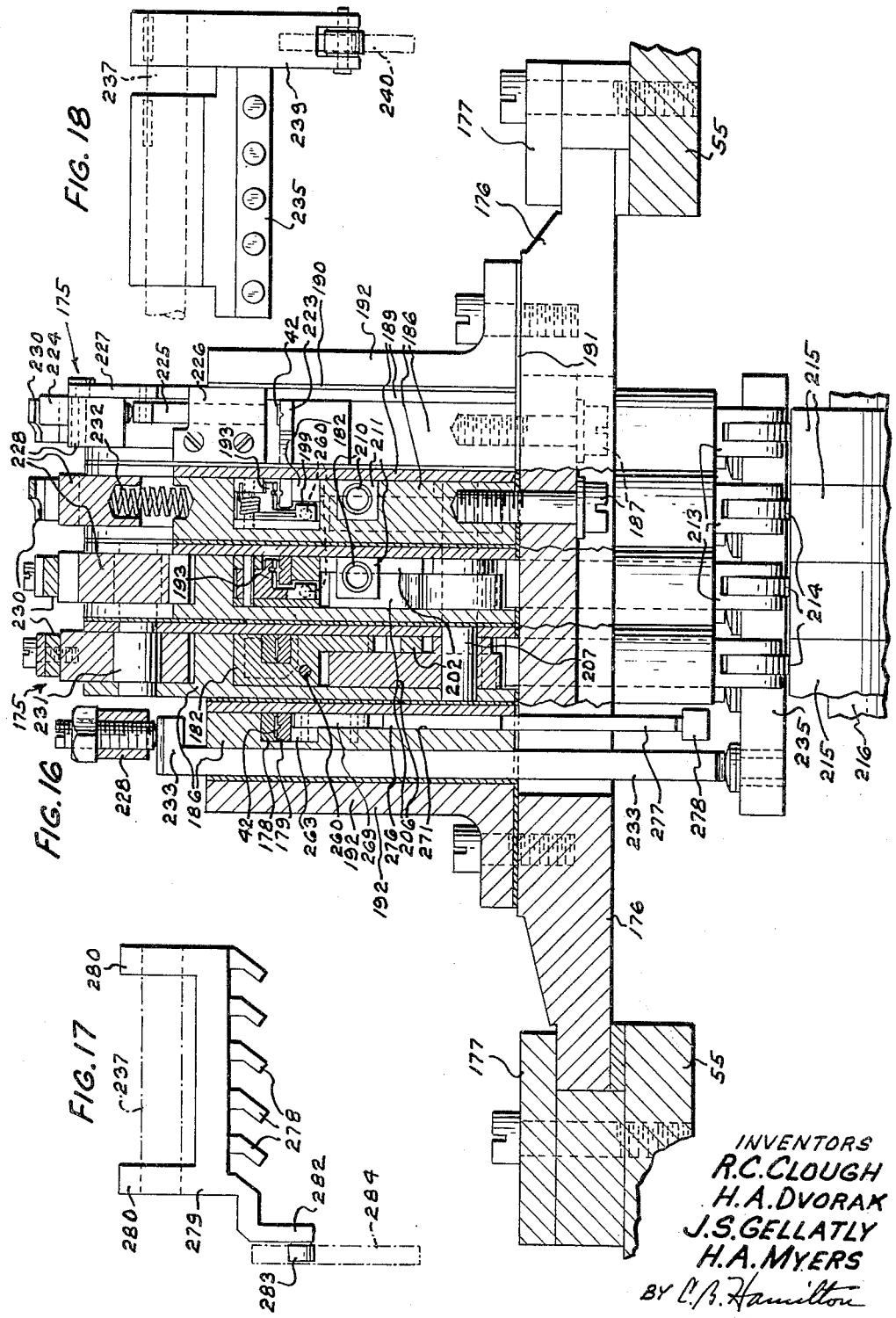
INVENTORS
R.C. CLOUGH
H.A. DVORAK
J.S. GELLATLY
H.A. MYERS
BY C.B. Hamilton
ATTORNEY INVENTORS
R.C. CLOUGH
H.A. DVORAK
J.S. GELLATLY
H.A. MYERS
BY C.A. Hamilton
ATTORNEY

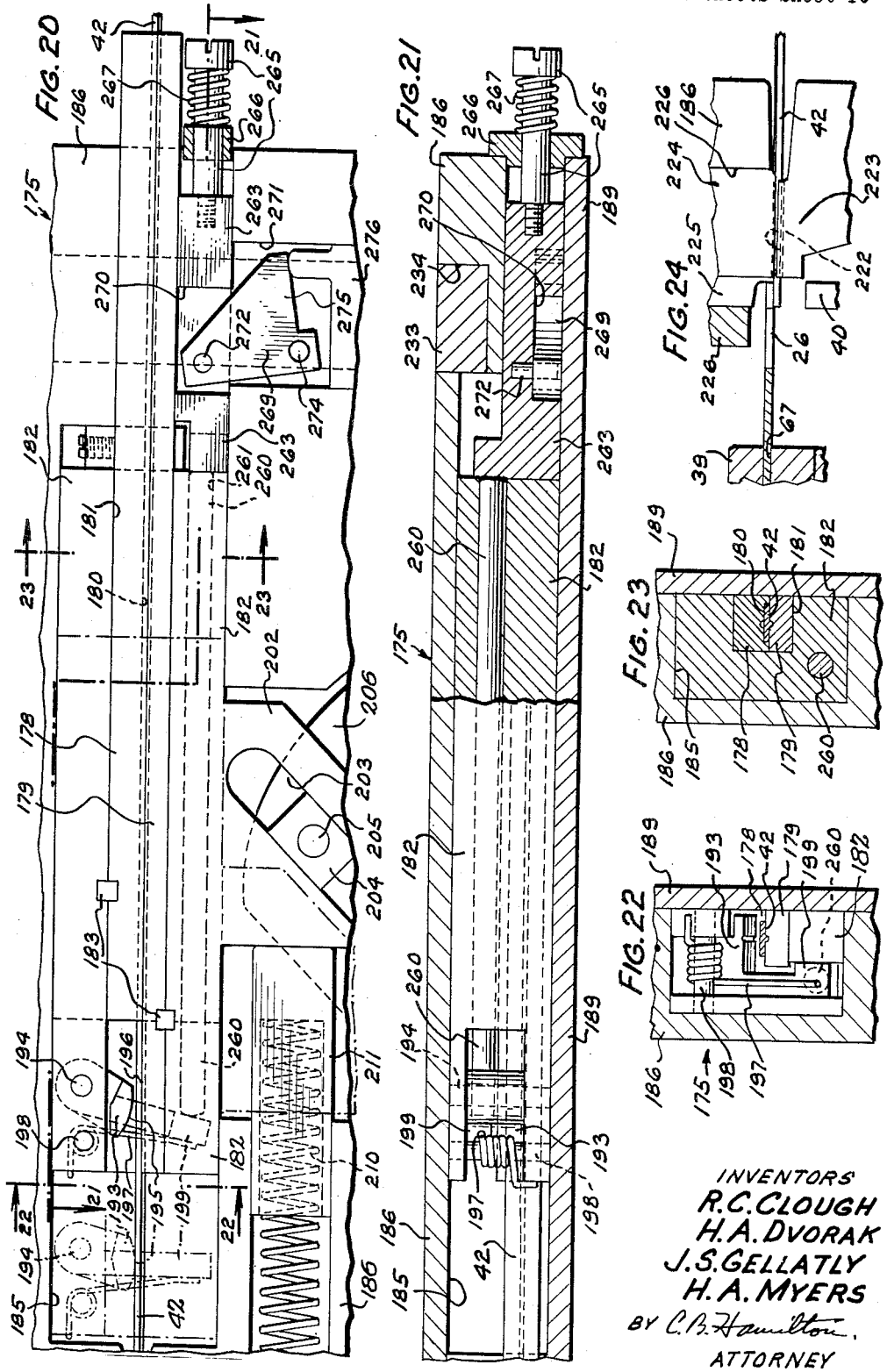

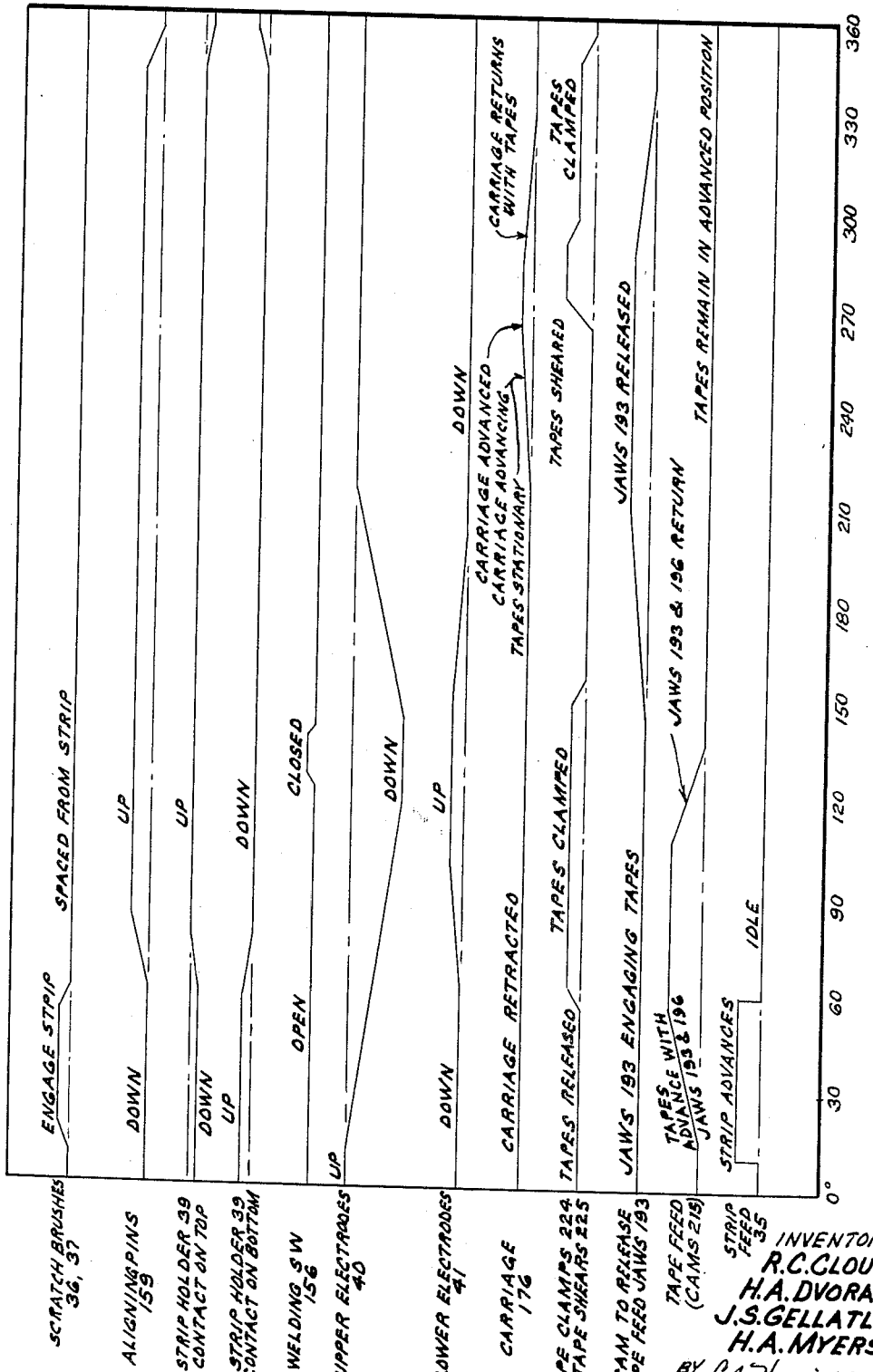

2,823,296

APPARATUS FOR WELDING CONTACTS ONTO A PART

Robert C. Clough, Lombard, and Howard A. Dvorak, Brookfield, Ill., John S. Gellatly, Westfield, N. J., and Hubert A. Myers, Los Angeles, Calif., assignors to Western Electric Company, Incorporated, New York, N. Y., a corporation of New York Application May 16, 1955, Serial No. 508,664

14 Claims. (Cl. 219—79)

This invention relates to electric welding apparatus and more particularly to an apparatus for welding the ends of contact tapes onto either side of a metal strip and shearing the tapes adjacent the strip to form contacts thereon.

An object of the invention is to provide an apparatus for intermittently feeding a preformed strip of metal having a plurality of tangs thereon and welding contacts onto the tangs.

Another object of the invention is to provide an apparatus for selectively welding a tape of contact material onto either side of a strip of metal and for shearing the tape adjacent the strip to form a contact thereon.

An apparatus illustrating certain features of the invention may include a frame having a holder mounted thereon for supporting a preformed strip in welding position, and having a carriage mounted thereon provided with tape feeding means for intermittently advancing a plurality of tapes of contact material in a horizontal plane into overlapping relation with a plurality of tangs formed on the strip. The holder may be supported in a position either above or below the plane of the tapes while the tapes are advanced, and the holder is actuated to move the strip into engagement with either the upper or the lower side of the tape, whereupon pairs of cooperating electrodes are moved into engagement with the overlapping portion of the tape and the tangs on the strip, and welding currents are passed therethrough to weld the ends of the tapes to the strip. The carriage is then advanced toward the holder and the strip to position pairs of tape cutting jaws adjacent the tangs for shearing the tapes adjacent the strip to form contacts on the tangs. A strip feed intermittently advances the strip to position successive groups of tangs in welding position, and rotating scratch brushes are intermittently moved into engagement with the strip as it is advanced to clean the tangs preparatory to welding the contacts thereto.

Other objects and advantages of the invention will become apparent by reference to the following detailed description and the accompanying drawings illustrating a preferred embodiment thereof, in which Fig. 1 is a fragmentary plan view of the apparatus for welding contacts onto the tangs of a pre-notched metal strip;

Fig. 2 is a vertical longitudinal sectional view of the contact welding apparatus taken on the line 2—2 of Fig. 1;

Fig. 3 is an enlarged fragmentary diagrammatic view showing the pre-notched metal strip in one position below the path of movement of the precious metal contact tape as the tape is fed in overlapping relation thereto;

Fig. 4 is a diagrammatic view similar to Fig. 3 showing the metal strip after it has been moved upwardly into engagement with the underside of the contact tape;

Fig. 5 is a fragmentary diagrammatic view showing the contact tape welded to the upper side of the metal strip and showing cutting means for shearing the welded portion from the tape to form the contact;

Fig. 6 is a fragmentary diagrammatic view showing the strip stock with a contact welded on the upper side thereof;

Fig. 7 is a view similar to Fig. 6 showing the metal strip stock with a contact welded on the underside thereof;

Fig. 8 is a fragmentary diagrammatic view showing the metal strip stock in two positions above the contact tape during the operation of welding the contact tape to the lower side of the metal strip;

Fig. 10 is an enlarged vertical transverse cross-sectional view through the apparatus taken along line 10—10 of Fig. 9;

Fig. 11 is an enlarged fragmentary front elevational view of the movable lower electrodes and the carrier therefor;

Fig. 12 is a fragmentary vertical longitudinal sectional view through a portion of the apparatus taken along line 12—12 of Figs. 9 and 10;

Fig. 13 is a fragmentary vertical cross-sectional view of the apparatus taken on line 13—13 of Fig. 12;

Fig. 15 is a fragmentary enlarged plan sectional view of the tape feeding and shearing mechanism of the apparatus;

Fig. 16 is a fragmentary vertical sectional view through the tape feeding mechanism of the apparatus taken on line 16—16 of Fig. 15;

Figs. 17 and 18 are reduced plan views of a pair of cam actuated levers of the tape feeding mechanism;

Fig. 20 is an enlarged fragmentary view of a portion of the tape feeding mechaninsm shown in Fig. 19 and showing some of the parts thereof in different positions;

Fig. 21 is a plan sectional view of the tape feeding mechanism taken on line 21—21 of Fig. 20;

Figs. 22 and 23 are fragmentary cross-sectional views through the tape feeding mechanism taken on lines 22—22 and 23—23, respectively, of Fig. 20;

Fig. 24 is a fragmentary view similar to Fig. 5 showing the cutting means in position to shear a tape welded to the underside of the strip; and Fig. 25 is a timing chart of the apparatus.

Figure 9:
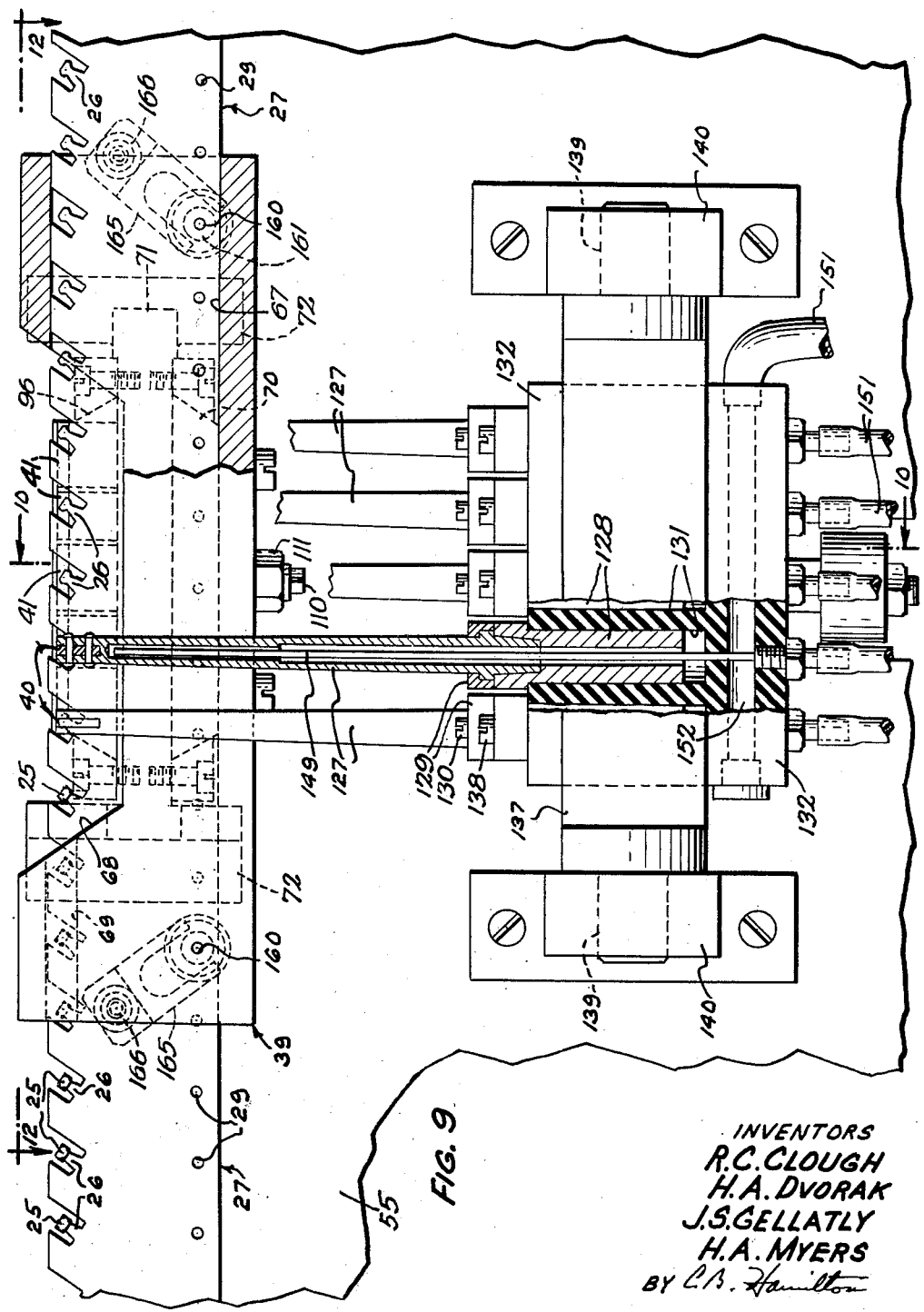
Fig. 9 is an enlarged fragmentary plan view of a portion of the contact welding apparatus showing the welding portion thereof.

The present apparatus is designed to weld contacts 25 of precious metal onto a plurality of tangs 26 disposed obliquely along one edge of a preformed metal strip 27 (Figs. 6 and 9). This apparatus is adapted to weld the contacts 25 onto the upper face of the tangs 26 as shown in Fig. 6 or to the underside of the tangs as shown in Fig. 7. In addition to having a notched edge to form the tangs 26, the preformed strip has a row of perforations 29 cooperating with means for accurately aligning the strip in the apparatus. Subsequent to the welding of the contacts onto the strip, wiper springs of a predetermined shape are punched therefrom which have the contacts 25 welded thereto.

In general, the apparatus comprises a feed means 35 (Fig. 1) for intermittently advancing the strip 27 predetermined uniform distances to advance successive groups of five tangs 26 to a welding station, a pair of rotary brushes 36 and 37 for scratch brushing the upper and lower surfaces of the tangs to clean them preparatory to welding the contacts thereon, a guide or holder 39 for supporting the strip 27 at the welding station, five sets of upper and lower electrodes 40 and 41, respectively (Fig. 10), connected individually to welding circuits and cooperating to simultaneously weld five contact tapes 42 onto five tangs of the strip, and a tape feeding and severing mechanism 43 for feeding the contact tapes in a horizontal plane onto the tangs and for severing the tapes adjacent the tangs after the tapes have been welded thereto.

The feed means 35 which advances the strip 27 step by step to position successive groups of five tangs in the welding station includes a pair of rolls 46 which are intermittently rotated by drive means including a cam 47 mounted on a shaft 48. This shaft is suitably supported for rotation and is driven through a sprocket and chain means 50 from a motor (not shown) and is connected by chain and sprocket means 52 to a main cam shaft 53. The shaft 53 is journalled in a plurality of bearings 54 secured to the underside of the main frame plate 55 of the apparatus on which the various components are mounted.

The wire brushes 36 and 37 are disposed on opposite sides of the strip 27 and in vertical alignment with the path of travel of the tangs 26 and are mounted on shafts of a pair of motors 56 which are secured to opposite sides of a vertically disposed plate 57. The plate 57 is supported for oscillatable movement about a horizontal shaft 58 which is supported in a pair of brackets 59 mounted on the frame plate 55. An apertured and slotted guide plate 60 supports the strip 27 while the tangs are being cleaned by the brushes 36 and 37. A spring 62 connected to the lower end of the plate 57 stresses the plate and the motors and brushes carried thereby for rotation in a counterclockwise direction as viewed in Fig. 2 to carry the brushes 36 and 37 out of engagement with the strip 27, and a cam 63 mounted on the cam shaft 53 in cooperation with a cam lever 64 pivotally supported on a fixed bracket 65, intermittently oscillates the plate and the motors carried thereby in a clockwise direction to move the brushes 36 and 37 into engagement with the strip 27 to scratch brush the tangs 26 on the strip as they are advanced relative thereto.

The strip guide or holder 39 (Figs. 9, 10, and 12) is in the form of a composite flat rectangular block having a horizontally disposed slot or guideway 67 for supporting the strip 27 for longitudinal movement and for preventing lateral or vertical displacement thereof. As viewed from above, the guide 39 is provided with a recess 68 between its ends to expose the five tangs 26 on which the contacts 25 are to be welded and to provide clearance for engagement of the tangs and the contact tapes 42 by the electrodes 40 and 41. The guideway 67 is enlarged at 69 (Figs. 9, 12, and 13) along one edge thereof in alignment with the tangs 26 on the strip 27 to provide clearance for the contacts 25 welded thereon. The contact tapes 42, each of which has a centrally disposed welding bead on one face thereof, are advanced in a horizontal plane at a predetermined fixed level into overlapping relation with the tangs 26 of the strip 27 and during the feeding movement of the contact tapes, the guide 39 is lowered to position the strip 27 below and in spaced relation to the plane of the contact tapes 42 (Fig. 3). After the contact tapes have been advanced into overlapping relation with the tangs, the guide 39 is actuated to raise the strip 27 into engagement with the tape (Fig. 4).

The strip guide 39 is secured to the upper end of a slide 70 (Figs. 9, 10 and 12) which is mounted for vertical reciprocation in a dovetailed slideway formed in a slide support 71. The slide support extends through an aperture in the frame plate 55 and has laterally extending ears 72 secured to the plate 55. The guide 39 is moved to and from the position shown in Figs. 3 and 4 by means including a cam 74 fixed to the cam shaft 53, a lever 75 and a disengageable connector element 76. The lever 75 is pivotally connected intermediate its ends to a bracket 78 fixed to the underneath side of the plate 55, and the lever has a laterally extending end 79 adapted to engage an arm 80 fixed to a shaft 81 of the connector element 76. The shaft 81 is oscillatably mounted in a pair of apertured lugs 82 formed on the lower portion of the slide 70 and the shaft 81 has a handle 83 by means of which the connector element 76 may be rotated to disengage the arm 80 from the lever 75. A spring 84 urges the lever 75 into engagement with the cam 74.

A second actuating means is provided for raising and lowering the guide 39 and the strip 27 to and from the positions indicated in full and dotted lines in Fig. 8 when the apparatus is set up for welding contacts to the underside of the tangs 26 of the strip 27. This actuating means includes a cam 85 on the cam shaft 53 (Fig. 14), a lever 86 pivotally mounted on a bracket 87 (Fig. 14) and having a laterally directed end portion 88 (Fig. 12) engageable with an arm 90 of the connector element 76. The arm 90 is angularly offset approximately 90° with respect to the arm 80, whereby in response to turning of the handle 83 and the shaft 81 through 90°, the arms 80 and 90 may be selectively connected and disconnected from engagement with their associated levers so that the apparatus may be set to either weld contacts to the upper side or to the lower side of the tangs 26 of the strip 27. A spring 91 which has one end thereof engaging in a groove in the shaft 81 serves to frictionally retain the connector element 76 in either of its two operative positions.

The lower electrodes 41 (Figs. 10, 11, and 12) are secured to the upper end of a slide 96 which is mounted for vertical reciprocation in a slideway in the slide support 71 on the opposite side from the slide 70 (Fig. 10). The slide 96 and the electrodes 41 are actuated by a cam 97 on the cam shaft 53 and a bell crank lever 98 oscillatably mounted on a pin 99 which is supported in a pair of lugs 100 formed on the lower portion of the slide support 71 and disposed on opposite sides of the lever 98. At one end, the lever 98 has a cam roller 101 engageable with the cam 97, and at its other end 102 fits in a slot in the slide 96 and a slot in the slide support 71 and is engageable with the lower end of a pin 103 which is adjustably mounted in a bore 104 in the slide 96 and is engageable at its upper end with a spirally shaped adjusting member 105. This member has a shank 106 which is rotatably supported in a tubular bearing 107 on the slide 96 and has a locking taper 108 cooperating with a conforming surface 109 in the bearing sleeve 107 for locking the cam 105 in adjusted position. The shank 106 has a square end 110 by means of which the cam 105 may be turned to vertically adjust the position of the top surface of the electrode 41, and a nut 111 threaded on the shank 106 may be tightened to hold the member 105 in its adjusted position. The slide 96 is urged for movement in a downward direction against the lever 98 by a spring 112 which is connected to an attaching plate 113 secured to the lower portion of the slide.

The lower electrodes 41 are secured to the slide 96 by screws 120 which are insulated from the electrodes by sleeves and washers of insulating material and the electrodes cemented to and spaced from each other in a lateral direction by strips of insulation 122. The electrodes 41 are also insulated from the slide 96 by a thin strip of insulation 123 to which the slide and the electrodes are cemented. A longitudinally disposed groove 124 in the lower portion of the electrodes 41 and the strips 122 communicates at its ends with a pair of vertical tubes 125 which are supported on the slide 96 in grooves therein and insulated therefrom by sleeves of insulation 126. At their upper ends, the tubes 125 are cemented to the strip of insulation 123 and at their lower ends the tubes are connected to means for circulating a coolant therethrough which serves to cool the lower electrodes 41 during the welding operation.

The upper electrodes 40 (Figs. 9 and 10) are secured to and extend transversely from cantilevers comprising removable tubular metal electrode elements 127 which have conical ends adapted to seat in conforming recesses in tubular metal socket members 128 and which are secured thereto by locking collars 129 and screws 130 and form a liquid tight connection. The socket members 128 fit in recesses 131 formed in a block 132 of insulating material in laterally spaced relation to each other. This block of insulating material fits into a rectangular aperture in a cradle 137 and is secured thereto by screws 138 which also secure the socket members 128 to the block 132. The cradle 137 has a pair of trunnions 139 journalled in bearing brackets 140 mounted on the frame plate 55 for supporting the upper electrodes 40 for oscillatable movement about a horizontal axis. A spring 142 connected to the cradle 137 through an arm 143 stresses the cradle and the electrodes 40 for movement in a counterclockwise direction as viewed in Fig. 10 to raise the electrodes to their open position, and a cam 144 on the cam shaft 53 cooperating with a composite arm 145 depending from the cradle 137 serves to oscillate the cradle and the electrodes in a clockwise direction to move the electrodes from their open position to their welding position in engagement with the contact tapes 42 or the tangs 26 of the metal strip 27. The composite arm 145 on the cradle 137 has an adjustable section 146 on one end of which is mounted the cam roller 147 engageable with the cam 144 and on the other end of which is provided an adjusting screw 148 by means of which the welding electrodes 40 may be angularly adjusted.

A plurality of hollow rods or tubes 149 are mounted on one end of the block 132 and extend through passageways 150 therein and through the hollow socket members 128 and into the forward end of the tubular electrode elements 127 for conducting a coolant to the electrodes 40 to cool them during the welding operation. The coolant is supplied to the electrodes through hoses 151 and flows through the inner tubes 149 to the forward ends of the tubular electrode elements 128 to cool the electrodes and then flows through the passageways around the tubes 149 into a transversely disposed bore 152 to one end of which is connected a return portion of the hose 151.

The five sets of upper and lower electrodes 40 and 41 are electrically connected individually by conductors 153 (Fig. 10) to a device 154 for supplying welding current thereto to effect the welding of the five contact tapes 42 onto the strip 27. A switch 156 (Figs. 1, 10, and 14) is actuated by a cam 157 on the main cam shaft 55 at the proper time to initiate the operation of the device 154 to pass a welding current through successive pairs of the electrodes to weld the ends of the tapes to the tangs of the strip in rapid succession.

To accurately position the strip and the tangs 26 at the welding station in alignment with the welding electrodes and the contact tapes 42, a pair of aligning pins 159 (Figs. 9, 12, and 13) are mounted in vertically disposed apertures 160 in the guide 39 for movement into the aligning perforations 29 in the strip 27. The aligning pins 159 are secured to plungers 161 which are reciprocable within cylinders 162 secured to the strip guide 39. The plungers 161 are urged upwardly by springs 163 and the lower ends thereof have enlarged heads 164 which are engageable by laterally extending bifurcated arms 165 secured to the upper end of rods 166. The rods are guided for vertical movement in guides 167 and have slots therein for receiving the ends of levers 168. These levers are mounted for rocking movement on pins 169 on the brackets 78 and 87 (Fig. 14) and are actuated by cams 171 on the cam shaft 53 for effecting the reciprocation of the aligning pins 160 in time relation to the actuation of the other components of the apparatus as indicated on the timing chart (Fig. 25).

The tap feeding mechanism 43 (Figs. 1, 15, 16, and 19) comprises five individual tape feeding units 175 obliquely mounted side by side on a carriage 176 in stepped or echelon relation to each other. The carriage 176 is supported in guides 177 on the frame plate 55 for horizontal movement in an oblique direction for moving the tape feeding units 175 toward and away from the five obliquely disposed tangs 26 onto which the contact tapes 42 are to be welded. Each of the tape feeding units 175 comprises a pair of horizontally disposed superposed guide rails 178, 179 (Figs. 19–21) grooved to form a guideway 180 therebetween for guiding the contact tape 42 therethrough. The guide rails 178, 179 are supported in a recess 181 of a U-shaped slide bar 182 and are secured therein against longitudinal movement by keys 183. The slide bar 182 is supported in a guideway 185 in a vertically disposed frame plate 186 which is secured at its lower edge to the carriage 176 by screws 187. A cover plate 189 is screwed to the side of the frame plate 186 and serves to prevent lateral displacement of the guide rails 178, 179 and the slide bar 182. The individual tape feeding units 175 and the carriage 176 are separated from each other by strips of insulation 190 and 191 and a pair of L-shaped brackets 192 help to rigidly secure the tape feeding units on the carriage 176.

The slide bar 182 and the lower guide rail 179 extend a predetermined distance beyond the forward end of the upper guide rail 178 (Figs. 19 and 20) and the upper overhanging portion of the slide bar is vertically slotted to receive a movable tape feeding jaw 193 which is mounted for oscillatable movement on a pivot pin 194, the ends of which are supported in an aperture in the overhanging portion of the slide bar 182. The jaw 193 has a curved lower surface 195 (Fig. 20) which is disposed in eccentric relation to the pivot pin 194 and is adapted to engage the upper surface of the contact tape 42 and press it against the upper surface of the projecting end of the lower guide rail 179 which forms a jaw 196 for cooperation with the movable jaw 193 to grip the tape therebetween for feeding movement. A torsion spring 197 supported on a pin 198 on the slide bar 182 engages a downwardly directed arm 199 on the movable jaw 193 to urge the jaw in a counterclockwise direction as viewed in Fig. 20 toward the lower jaw to effect a gripping engagement with the tape 42 for feeding movement to the left as viewed in said figure.

Means are provided for reciprocating the slide bar 182 to advance the tape 42 into overlapping relation with the tangs 26 of the strip 27 as shown in Fig. 4 and for this purpose the slide bar 182 has a relatively thin downwardly projecting plate portion 202 which is provided with an obliquely disposed slot 203 in which a block 204 is slidably mounted. The block 204 is pivotally supported on a horizontally disposed pin 205 fixed to a rocker arm 206 which is mounted for oscillatable movement about a pin 207 journalled at its ends in the frame plate 186 and the cover plate 189. The rocker arm 206, which is disposed in a recess 208 in the frame plate 186, and the slide bar 182 are urged for movement to the right to their normal retracted position by a spring 210 and a plunger 211 slidably mounted in a horizontal bore in the frame plate 186 and bearing against the depending plate portion 202 of the slide bar. The rocker arm 206 has a laterally extending portion 212 engageable with the upper end of a plunger 213 which is guided for vertical reciprocation in the carriage 176 and extends through a large opening in the frame plate and has a cam roller 214 at its lower end riding on a cam 215.

The cams 215 of the several tape feed units 175 are fixed to an auxiliary cam shaft 216 which is supported in bearing brackets 217 (Fig. 14) secured to the underside of the carriage 176 for horizontal, oblique, reciprocable movement therewith. The cam shaft 216 is connected through a universal and telescoping connection 218 to a shaft 219 which is supported in bearing blocks 220 on the frame plate 55 and is connected through a sprocket and chain drive 221 to the main cam shaft 53 for rotation therewith. Thus, the tape feed cams 215 in cooperation with the spring pressed plungers 211 serve to advance the slide bars 182, the tape feeding jaws 193, 196 and the tapes 42 gripped between the jaws, to position the ends of the tapes in overlapping relation to the five tangs 26 aligned therewith as shown in Fig. 3 and in dotted lines in Fig. 19.

The tape 42 of each tape feeding unit 175 is supported and guided in a shallow groove 222 in the upper face of a stationary cutting jaw 223 (Figs. 5 and 19) on the forward portion of the frame plate 186 and the tape passes under a clamp 224 and a movable cutting jaw 225. The jaws 223 and 225 cooperate to sever the tape 42 after it has been welded to the tang 26 and the lower end of the movable cutting jaw 225 is relatively narrow to engage the tape 42 (Fig. 24) and sever it adjacent the tang 26 when the contacts are being welded to the underside of the strip 27. The clamp 224 and the cutting jaw 225 are mounted in abutting relation to each other for vertical movement in a vertically disposed guideway 226 formed in the frame plate 186, the cover plate 189, and a member 226 secured to the frame plate (Figs. 15 and 16). The movable cutting jaw 225 is connected at its upper end to one end of a link 227, the upper end of which is pivotally connected to one end of a lever 228 for actuating the movable jaw. The clamp 224 at its upper end has a pin 229 projecting laterally therefrom which is engageable with the upper surface of the lever 228 and is moved thereby in an upward direction, and a leaf spring 230 secured at one end to the lever 228 is engageable with the upper end of the clamp to move it downwardly to yieldably clamp the tape 42 against the surface 222 of the lower cutting jaw 223 in response to rocking movement of the lever 228 in a clockwise direction as viewed in Fig. 19. The cutting edge of the movable cutting jaw 225 is normally positioned above the bottom face of the clamp 224 so that the lever 228 may be moved to a first position to actuate the clamp and cause it to clamp the tape against longitudinal movement, and so that the lever may be moved farther to a second position to cause the movable cutting jaw 225 to shear the tape 42.

Figure 14:
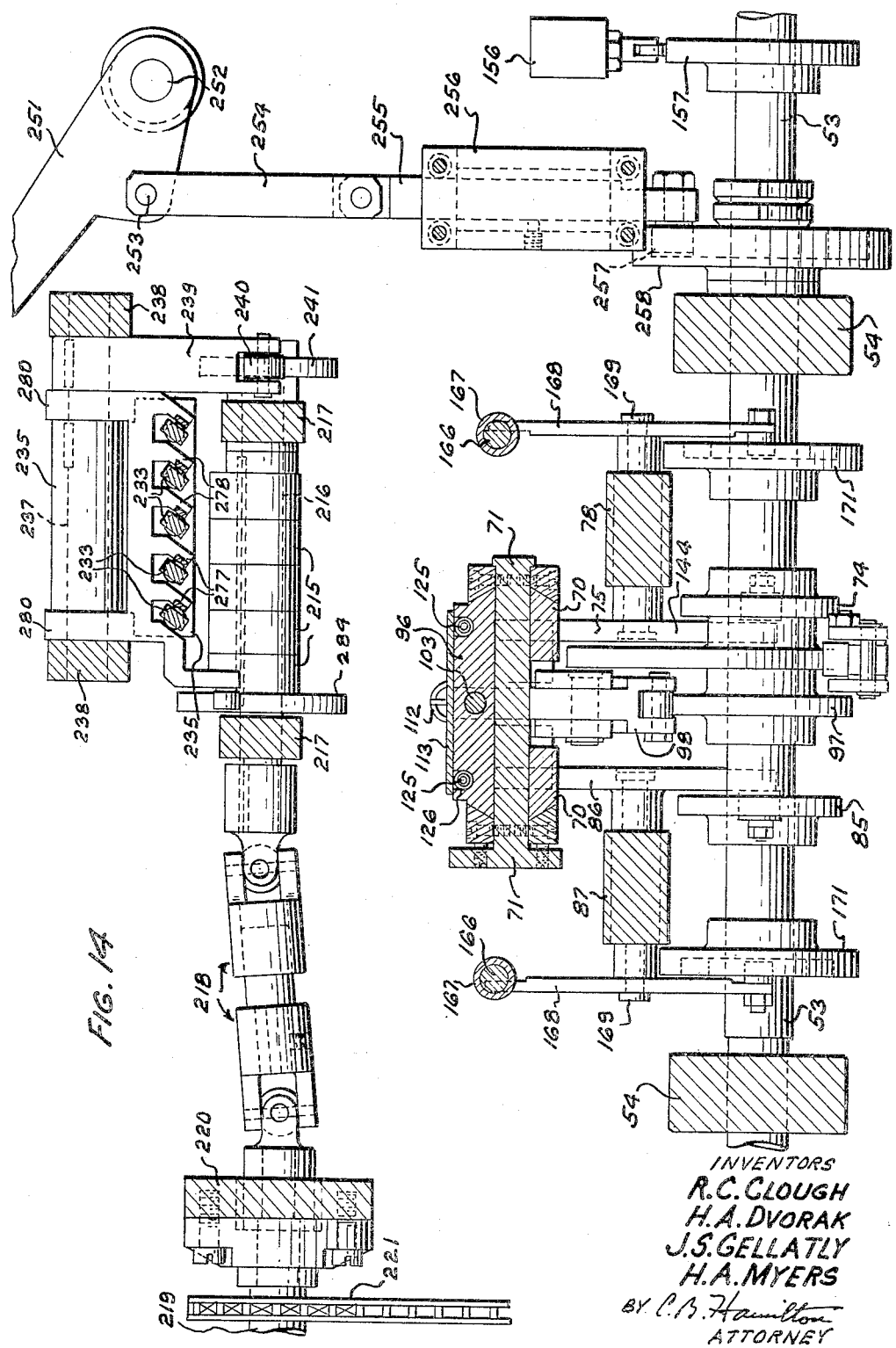
Fig. 14 is a fragmentary plan sectional view of a portion of the apparatus taken on line 14—14 of Fig. 2 showing a portion of the drive for actuating some of the components of the apparatus.
Figure 19:
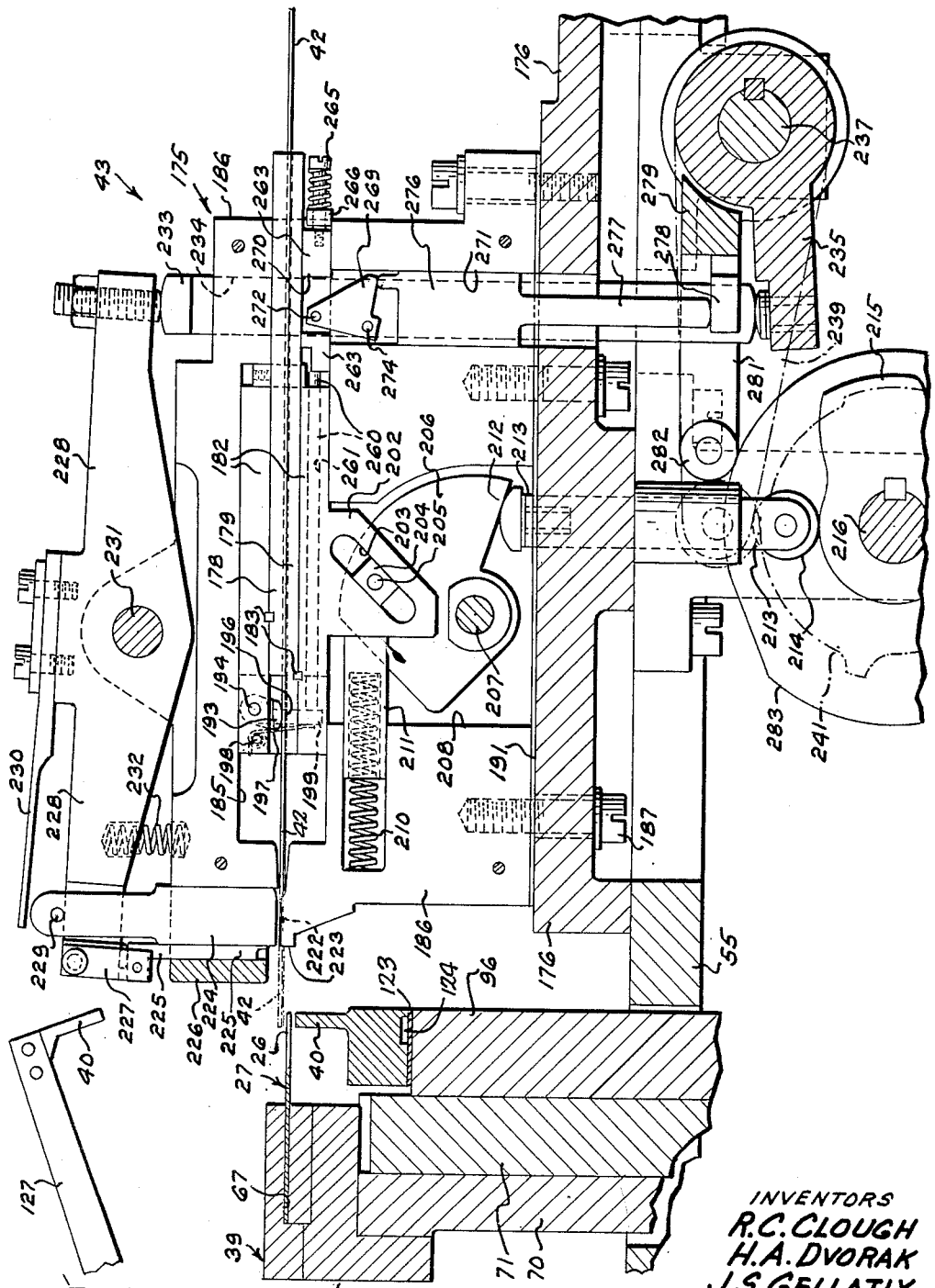
Fig. 19 is a vertical sectional view through the tape feeding mechanism of the welding apparatus taken on line 19—19 of Fig. 15.

The lever 228 is mounted intermediate its end for oscillatable movement on a pin 231 which is supported at its ends in the frame plate 186 and the cover plate 189, and the lever is stressed by a spring 232 for movement, tending to raise the clamp 224 and the cutter 225. The other end of the lever 228 engages the upper end of a rod 233 which is guided in a vertical slot 234 in the frame plate 186, and the lower end of the rod rests on a lever 235 (Figs. 14, 18, and 19). The lever 235 is in the form of a wide bar or plate (Fig. 18) engageable with each of the five rods 233 and having an enlarged hub portion secured to a shaft 237 which is supported in bearing brackets 238 secured to the underside of the carriage 176. A cam lever 239 fixed to the shaft 237 has a cam roller 240 engageable with a cam 241 on the auxiliary cam shaft 216 for effecting the actuation of the clamp 224 and the movable cutting jaw 225 in timed relation to the actuation of the other components of the apparatus as shown on the timing chart (Fig. 25).

After the tapes 42 have been fed into overlapping relation to the tangs 26 and the ends of the tapes have been welded thereto, the carriage 176 is advanced from its normal retracted position shown in Figs. 1 and 19 to a forward position to move the cutting jaws 223 and 225 into the position shown in Fig. 5 with the lower jaws 223 adjacent the tangs 26 and adjacent the welded end portion of the tapes 42. A block 249 (Fig. 1) is fixed to the underside of the carriage and has a slot therein for receiving a roller 250 mounted on one end of an actuating arm 251, which, at its other end, is mounted for horizontal oscillatable movement about a pin 252 secured to the underside of the frame plate 55. At an intermediate point 253 the arm 251 is pivotally connected to a link 254 which is pivotally connected to one end of a slide 255 mounted for reciprocable movement in a guide 256 which is secured to the underside of the frame plate 55. At its other end the slide 255 has a cam roller 257 which rides in a groove in a cam 258 fixed to the main cam shaft 53, whereby in response to rotation of the cam 258 the carriage 176 is caused to move to and from its normally retracted position and its advanced position in predetermined timed relation to the movement of the other components of the apparatus as indicated on the timing chart (Fig. 24).

Means are provided for actuating the tape feeding jaws 193, 196 in each of the tape feeding units 175 to release their grip on the tape 42 during movement of the carriage 176 to its forward position so that the tapes will not be advanced with the carriage and damaged thereby. This means includes a horizontally disposed rod 260 slidably supported in a bore 261 in the slide bar 182 (Figs. 19–22) with its forward end in engagement with the depending arm 199 of the gripping jaw 193 and with its other end engageable with the forward end of a pusher bar 263. The pusher bar is mounted behind the slide bar 182 and below the guide rail 179 for sliding movement in the rear portion of the slot 185 in the frame plate 186 and has a cylindrical extension in the form of a headed screw 265. This screw extends through an aperture in a member 266 which extends across the end of the guideway 185 and is supported on the frame plate 186 and the cover plate 189 (Fig. 21), and a spring 267 interposed between the member 266 and the head of the screw 265 urges the pusher bar 263 to the right as viewed in Figs. 19 and 20 to its retracted position (Fig. 19). With the pusher bar in its retracted position the tape feeding jaw 193 is free to turn on the pin 194 and is held by the spring 197 in gripping engagement with the tape 42.

A triangular-shaped lever 269 which is disposed in a recess 270 in the bar 263 and a recess 271 in the frame plate 186, is pivotally connected at 272 to the bar 263 and is pivotally mounted on a fixed pin 274 which is supported in the frame plate 186 and the cover plate 189. A laterally disposed portion 275 of the lever 269 rests on the upper end of a slide 276 which is mounted for vertical movement in the vertical recess 271 in the frame plate and has a reduced depending portion in the form of a bar 277 supported on an arm 278 of a composite lever 279 (Fig. 17). The arms 278 of the lever 279 are disposed obliquely and fit between the rods 233 (Fig. 14). The lever 279 has a pair of hubs 280 which are pivotally supported on the shaft 237 adjacent the ends of the lever 235 and the lever 279 has an arm 282 with a cam roller 283 thereon which engages a cam 284. This cam is fixed to the auxiliary cam shaft 216 (Fig. 14) and serves to reciprocate the pusher bar 263 and cause the tape feeding jaw 193 to release the tape 42 at predetermined intervals (Fig. 24).

Thus, in the operation of the tape feeding and severing mechanism, as the five slide bars 182 of the tape feeding units 175 are moved in a forward direction from their retracted positions, the gripping jaws 193 which are yieldably held in gripping engagement with the five tapes 42, advance the tapes into overlapping relation with five tangs 26 on the strip 27, after which the clamps 225 are actuated to clamp the tapes 42 against the surfaces 223 and hold the tapes against movement while the slide bars 182 and the tape gripping jaws are returned to their normal retracted positions. After the ends of the tapes have been welded to the tangs 26 and prior to advancing the carriage 176 from its retracted position, the cam 283 serves to actuate the linkages 277, 276, 275, 263, 262 to move the movable tape gripping jaws 193 to open position to release the tapes, after which the carriage 176 is advanced to move the cutting jaws 223 and 225 in positions adjacent the tangs 26 and the welded ends of the contact tape 42 as shown in Fig. 5, after which the cam 241 serves to actuate the clamps 224 to clamp the tapes and then actuate the cutters 226 to sever the tapes adjacent the tangs 26 to form the contacts 25 thereon.

From the above description it will be seen that the welding apparatus may be set up to weld the contacts 25 onto the upper surface of the tangs 26 of the metal strip 27 as shown in Fig. 6, or to weld the contacts 25 onto the underside of the tangs of the strip as shown in Fig. 7. With the apparatus set up to weld the contact 25 to the upper face of the tang 26 of the strip 27, and with the tapes 42 positioned with the welding beads directed downwardly, the strip feed 35 operates to advance the strip 27 intermittently to position successive sets of five tangs 26 in welding position in the guide 39 in alignment with the upper and lower electrodes 40 and 41 and in the path of movement of the tapes 42. The rotating wire brushes 36, 37 are moved into engagement with opposite sides of the strip 27 to clean the upper and lower surfaces of the tangs 26 during the advancing movement thereof. With the jaws 193 gripping the tapes 42, the slide bars 182 are advanced to feed the tapes into overlapping relation to the tangs 26 as shown in Fig. 3, during which feeding movement of the tapes the strip guide 39 is in its lower position to support the strip 27 below and in spaced relation to the plane of the tapes. After the tapes 42 have been advanced, the guide 39 and the strip 27 are raised to move the tangs 26 into engagement with the ends of the tapes, and the aligning pins 160 on the strip guide 39 are moved into the aligning apertures 29 of the strip 27 to accurately position the strip and the tangs 26 thereon relative to the welding electrodes and the tapes 42.

The clamps 224 are then actuated to clamp the tapes against longitudinal movement. The lower electrodes 41 are moved up into engagement with the tangs 26 of the strip 27 and the upper electrodes 40 are moved down into engagement with the contact tapes 42 with a pressure sufficient to slightly flex the resilient cantilever electrode elements 127 to press the tapes tightly against the tangs, and while they are pressed together the switch 157 is closed to cause the device 154 to pass a welding current through the electrodes and the overlapping portions of the strip and the tapes to weld the ends of the tapes to the tangs. The electrodes are then moved away from the welded portions of the strip and tapes and as the electrodes return to their open positions, the tape feeding jaws 193 are actuated to open position by the pusher bar 263 and the rod 260 to release the tapes (Fig. 25).

While the tape feeding jaws 193 are held in their released or open position, the carriage 176 is advanced to move the cutting jaws 223 and 225 into close proximity to the tangs 26 of the strip 27 and the welded ends of the tapes 42 as shown in Fig. 5, after which the lever 230 is operated to actuate the clamps 224 to clamp the tapes and to actuate the movable cutter jaws 225 to sever the contact tapes adjacent the tangs to form the contact 25. The cutting jaws 225 are then retracted but the clamps 224 still hold the tapes against movement while the carriage 176 is returned to its normal retracted position, after which the clamps 224 are raised to release the tapes. During the return movement of the carriage 176 the pusher bar 263 is retracted to render the jaws 193 operable to engage and grip the tape 42. The strip guide 39 is then lowered to position the strip 27 in vertically spaced relation to the level of the tapes and the aligning pins 160 on the strip guide are withdrawn from the aligning apertures 29 in the strip 27, and the apparatus has completed one cycle of operation.

When the apparatus is to be used for welding contacts onto the lower side of the tangs 26, the tapes 42 positioned in the tape feeding device 43 with the welding bead directed upwardly, and the connector element 76 is shifted to disengage the arm 80 thereof from the lever 75 and to engage the arm 90 of the connector element with the lever 86 to cause the strip guide 39 to be actuated above the plane of the tapes 42 between the positions shown in full and dotted lines in Fig. 8 into and out of engagement with the upper side of the tapes.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for selectively welding contact tapes to either side of a metal strip, the combination of means for supporting a metal strip, means for feeding a tape of contact material in a plane toward the strip supporting means and into overlapping relation to said strip, means for selectively moving said strip supporting means to one position to support the strip on one side of said plane and said tape and for moving said strip supporting means to another position to support the strip on the other side of said plane and said tape, and means for welding together the overlapping portions of the tape and the strip.

2. In an apparatus for forming and selectively welding contacts to either side of a metal strip, the combination of means for supporting a metal strip, means for feeding a tape of contact material in a substantially horizontal plane toward the strip supporting means and into overlapping relation to said strip, means for selectively moving said strip supporting means to one position to support the strip above said plane for engagement with the upper side of said tape and for moving said strip supporting means to another position to support the strip below said plane for engagement with the lower side of said tape, means for welding together the overlapping portions of the tape and the strip, and means for severing the tape adjacent the strip to form a contact thereon.

3. In an apparatus for forming and welding a contact onto a part, the combination of a holder for supporting the part in a predetermined position, means for advancing a tape of contact material in a plane into overlapping relation to said part, means for moving said holder transversely of said plane to a first position for supporting the part in spaced relation to said plane while the tape is being advanced into overlapping relation thereto and to a second position for supporting the part in engagement with the tape after the tape has been advanced, means for welding the overlapping portion of the tape to said part, and means for shearing said tape adjacent said part to form a contact thereon.

4. In an apparatus for forming and welding a contact onto a part, the combination of a holder for supporting the part in a predetermined position, means for advancing a tape of contact material in a plane toward said holder into overlapping relation with the part, means for moving said holder perpendicular to said plane to a first position for supporting the part in spaced relation to said plane while the tape is being advanced into overlapping relation thereto and to a second position for supporting the part in engagement with the tape after the tape has been advanced, a pair of electrodes, means for moving said electrodes into engagement with the overlapping portions of said part in said tape, means for supplying a welding current to said electrodes to weld the tape to said part, and means for shearing said tape adjacent said part to form a contact thereon.

5. In an apparatus for forming and welding contacts onto a metal strip comprising a frame, guide means on said frame for supporting the strip in a welding station and for longitudinal movement, means for intermittently advancing said strip to position successive portions thereof at the welding station, a carriage mounted on said frame for movement toward and away from said welding station, means on said carriage for feeding a plurality of tapes toward said welding station into overlapping relation with the strip therein, means for welding the overlapping portions of the tapes to the strip, a plurality of cooperable cutting members on said carriage for severing the tapes, means for moving said carriage to an operative position at said welding station with the cutting members disposed adjacent said strip, and means for actuating said cutting members to sever the welded end portion of the tapes to form contacts on the strip.

6. In an apparatus for forming and welding contacts onto a metal strip, the combination of a frame, a first means on said frame for supporting a flat metal strip in a welding station and for longitudinal movement, a second supporting means on said frame for supporting a plurality of tapes for movement transversely of said strip, means on said second supporting means for feeding said tapes into overlapping relation to said strip, means for actuating one of said supporting means to a first position with the strip and the tapes in spaced relation to each other during the feeding of said tapes into overlapping relation with said strip and for actuating said one supporting means to a second position with the tapes in engagement with one side of the strip after the tapes have been fed into overlapping relation therewith, means for welding the overlapping portion of the tapes to the strip, and means for severing the tapes adjacent said strip to form contacts thereon.

7. In an apparatus for forming and welding contacts onto a preformed metal strip having spaced tangs thereon, a frame, a holder on said frame for supporting said strip for intermittent longitudinal movement, means for intermittently advancing said strip through predetermined uniform distances to dispose a group of tangs in welding position, means on said frame for advancing a plurality of contact tapes in a substantially horizontal plane into a welding position in overlapping relation to a plurality of said tangs on the strip, means for moving said holder vertically to a first position with the strip in spaced relation to said plane while the tape is being advanced and for moving said holder to a second position with the tangs in engagement with one side of the tape, a plurality of pairs of cooperable electrodes mounted on said frame in alignment with said tapes, means for moving said electrodes into engagement with the overlapping portions of said tangs and said tape, means for supplying welding currents to said pairs of electrodes to weld the ends of the tapes to said tangs, and means for shearing the tapes adjacent said tangs to form contacts thereon.

8. In an apparatus for forming and welding contacts onto a metal strip, the combination of a holder for supporting the strip in a welding position, means for advancing a tape of contact material in a plane to a welding position in overlapping relation with said strip, a first means for moving said holder perpendicular to said plane to a first position to support the strip on one side of said plane and in spaced relation thereto while the tape is being advanced to said welding position and for moving said holder to a second position with the strip in engagement with said one side of the tape after the strip has been advanced to said welding position, a second means for moving said holder perpendicular to said plane to a third position for supporting the strip on the other side of said plane and in spaced relation thereto while the tape is being advanced to said welding position and for moving said holder to a fourth position with the strip in engagement with the other side of said tape after it has been advanced to said welding position, means for selectively rendering one of said first and said second means operable and the other inoperable to move said holder, and means for welding the overlapping portion of the tape to the strip.

9. In an apparatus for forming and welding a contact onto a metal strip, the combination of a holder for supporting said strip in a welding position, a frame for supporting said holder for movement up and down, means on said frame for feeding a tape in a substantially horizontal plane into overlapping relation with said strip, a first actuating means for moving said holder to a first position with the strip below said plane while the tape is being advanced and for moving said holder to a second position with the strip in engagement with the lower side of the tape after the tape has been advanced, a second actuating means for moving said holder to one position spaced above said plane while the tape is being advanced and for moving the holder to another position with the strip in engagement with the upper side of the tape after the strip has been advanced, means mounted on said holder selectively settable to render either one of said actuating means operable and the other one inoperable to move said holder, a pair of movable electrodes, means for moving said electrodes into engagement with the overlapping portion of said strip and said tape, means for supplying a welding current to the electrode to weld the tape to said strip, and means for shearing the tape adjacent said strip to form said contact thereon.

10. In an apparatus for forming and welding a contact onto a metal strip, the combination of a holder for supporting said strip in a welding position, a frame for supporting said holder for substantially vertical movement, means on said frame for feeding a tape in a substantially horizontal plane to a welding position in overlapping relation to said strip, a first actuating means for moving said holder to a first position for supporting the strip below said plane and in spaced relation thereto while the tape is being advanced to said welding position and for raising said holder to a second position with the strip in engagement with the underside of the tape after the tape has been advanced to said welding position, a second actuating means for moving said holder to a third position for supporting the strip above said plane while the tape is being advanced to said welding position and for lowering the holder to a fourth position with the strip in engagement with the upper side of the tape, selector means on said holder movable to and from first and second positions and operable in said first position to render said first actuating means effective to move said holder and operable in said second position to render said second actuating means effective to move said holder, means for moving said selector means to and from said first and said second positions, means for welding the overlapping portion of the tape to the strip, and means for severing the tape adjacent the strip to form a contact on the strip.

11. In an apparatus for forming and welding a contact onto a metal strip, the combination of guide means for supporting a strip in a welding station and for longitudinal movement thereof, means for intermittently advancing said strip to position successive portions thereof in the welding station, means for feeding a tape of contact material in a plane to the welding station in overlapping relation to said strip in timed relation to the movement of the strip, means for moving said guide means transversely of said plane to a first position for supporting the strip in spaced relation to said plane while said tape is being advanced and for moving said guide means to a second position with the strip in engagement with one side of said tape after the tape has been advanced, means for welding together the overlapping portions of the strip and tape in timed relation to the movement of the strip, means for severing the tape adjacent the strip in timed relation to the movement of the strip.

12. An apparatus for welding one strip to another strip in overlapping relation comprising means for supporting one strip, means for supporting the other strip, selectively operable means for effecting relative movement between said supporting means to selectively move one of said strips into an overlapping position on one side or the other side of the other strip, and means for welding the strips together while in the overlapped position.

13. In an apparatus for welding one strip to another strip in overlapping relation, means for supporting one strip, means for supporting the other strip, means for effecting relative movement of said supporting means in one direction to move the strips into an overlapping relation to each other, selectively operable means for moving one of said supporting means transversely of said one direction to selectively position one of the strips on one side or the other side of the other strip, and means for welding the overlapping portions of the strips together.

14. In an apparatus for welding a tape onto a part, the combination of a holder for supporting the part in a predetermined position, means for advancing a tape in a plane into overlapping relation to said part, means for moving said holder transversely of said plane to a first position for supporting the part in spaced relation to said plane while the tape is being advanced into overlapping relation thereto and to a second position for supporting the part in engagement with the tape after the tape has been advanced, and means for welding together the overlapping portions of the tape and the part.

References Cited in the file of this patent

UNITED STATES PATENTS

| | | |
|---|---|---|
| 1,259,272 | Murray | Mar. 12, 1918 |
| 2,024,597 | Pfeiffer | Dec. 17, 1935 |
| 2,325,507 | Guirl et al. | July 27, 1943 |
| 2,339,884 | Schlumpf | Jan. 25, 1944 |
| 2,343,686 | Martindell | Mar. 7, 1944 |
| 2,351,722 | Swenson | June 20, 1944 |